(12) United States Patent
Mei et al.

(10) Patent No.: US 11,947,925 B2
(45) Date of Patent: Apr. 2, 2024

(54) ADAPTIVE LANGUAGE TRANSLATION USING CONTEXT FEATURES

(71) Applicant: International Business Machines Corporation, Armonk, NY (US)

(72) Inventors: Lei Mei, Ningbo (CN); Kun Yan Yin, Ningbo (CN); Yan Hu, Ningbo (CN); Qi Ruan, Ningbo (CN); Yan Feng Han, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 16/879,886

(22) Filed: May 21, 2020

(65) Prior Publication Data
US 2021/0365644 A1 Nov. 25, 2021

(51) Int. Cl.
*G06F 40/58* (2020.01)
*G06N 3/044* (2023.01)
*G06N 3/08* (2023.01)

(52) U.S. Cl.
CPC .............. *G06F 40/58* (2020.01); *G06N 3/044* (2023.01); *G06N 3/08* (2013.01)

(58) Field of Classification Search
None
See application file for complete search history.

(56) References Cited

U.S. PATENT DOCUMENTS

| | | | |
|---|---|---|---|
| 9,053,096 B2 | 6/2015 | Lord et al. | |
| 10,902,215 B1 * | 1/2021 | Zhang | G06F 40/35 |
| 11,295,081 B1 * | 4/2022 | Federico | G06N 3/08 |

(Continued)

FOREIGN PATENT DOCUMENTS

| | | |
|---|---|---|
| CN | 108920472 A | 11/2018 |
| CN | 109508462 A | 3/2019 |

(Continued)

OTHER PUBLICATIONS

M. M. Badr, A. M. Sarhan and R. M. Elbasiony, "Facial Age Estimation using Deep neural networks: A Survey," 2019 15th International Computer Engineering Conference (ICENCO), 2019, pp. 183-191, doi: 10.1109/ICENCO48310.2019.9027363. (Year: 2019).*

(Continued)

*Primary Examiner* — Richemond Dorvil
*Assistant Examiner* — Alexander G Marlow
(74) *Attorney, Agent, or Firm* — Donald J. O'Brien (57) ABSTRACT

A user input in a source language is received. A set of contextual data is received. The user input is encoded into a user input feature vector. The set of contextual data is encoded into a context feature vector. The user input feature vector and the context feature vector are used to generate a fusion vector. An adaptive neural network is trained to identify a second context feature vector, based on the fusion vector. A second user input in the source language is received for translation into a target language. The adaptive neural network is used to determine, based on the second context feature vector, a second user input feature vector. The second user input feature vector is decoded, based on the source language and the target language, into a target language output. A user is notified of the target language output.

20 Claims, 7 Drawing Sheets

(56) References Cited

U.S. PATENT DOCUMENTS

| | | | |
|---|---|---|---|
| 2017/0177564 A1* | 6/2017 | Rottmann | G06F 40/295 |
| 2017/0185583 A1* | 6/2017 | Pino | G06N 7/01 |
| 2018/0365232 A1* | 12/2018 | Lewis | G10L 15/26 |
| 2019/0163747 A1 | 5/2019 | Kang et al. | |
| 2020/0034436 A1 | 1/2020 | Chen et al. | |
| 2020/0042602 A1* | 2/2020 | Anderson | G10L 15/1822 |
| 2020/0073947 A1* | 3/2020 | Bertoldi | G06F 40/47 |
| 2020/0193971 A1* | 6/2020 | Feinauer | G10L 15/075 |
| 2021/0141867 A1* | 5/2021 | Wason | G06V 10/82 |

FOREIGN PATENT DOCUMENTS

| | | | | |
|---|---|---|---|---|
| KR | 20200032441 A | * | 3/2020 | |
| WO | WO-2018213763 A1 | * | 11/2018 | F02B 67/06 |
| WO | WO-2019225028 A1 | * | 11/2019 | |

OTHER PUBLICATIONS

R. Ranjan et al., "Unconstrained Age Estimation with Deep Convolutional Neural Networks," 2015 IEEE International Conference on Computer Vision Workshop (ICCVW), 2015, pp. 351-359, doi: 10.1109/ICCVW.2015.54. (Year: 2015).*

Yi, Dong., Lei, Z., Li, S.Z. (2015). Age Estimation by Multi-scale Convolutional Network. In: Cremers, D., Reid, I., Saito, H., Yang, MH. (eds) Computer Vision—ACCV 2014. ACCV 2014. Lecture Notes in Computer Science(), vol. 9005. Springer, Cham. https://doi.org/10.1007/978-3-319-16811-1_10 (Year: 2015).*

Xing Niu, Sudha Rao, and Marine Carpuat. 2018. Multi-Task Neural Models for Translating Between Styles Within and Across Languages. In Proceedings of the 27th International Conference on Computational Linguistics, pp. 1008-1021, Santa Fe, New Mexico, USA. Association for Computational Linguistics. (Year: 2018).*

Paul Michel and Graham Neubig. 2018. Extreme Adaptation for Personalized Neural Machine Translation. In Proceedings of the 56th Annual Meeting of the Association for Computational Linguistics (vol. 2: Short Papers), pp. 312-318, Melbourne, Australia. Association for Computational Linguistics. (Year: 2018).*

Rico Sennrich, Barry Haddow, and Alexandra Birch. 2016. Controlling Politeness in Neural Machine Translation via Side Constraints. In Proceedings of the 2016 Conference of the North American Chapter of the Association for Computational Linguistics: Human Language Technologies, pp. 35-40 (Year: 2016).*

Tom Kocmi "Document Embeddings as a Means of Domain Adaptation for the Machine Translation" retrieved from https://web.archive.org/web/20191113023732/http://ufal.mff.cuni.cz/~zabokrtsky/pgs/thesis_proposal/tom-kocmi-proposal.pdf (Year: 2019).*

Tom Kocmi "document Embeddings as a Means of Domain Adaption for the Machine Translation" retrieved from https://web.archive.org/web/20191113023732/http://ufal.mff.cuni.cz/~zabokrtsky/pgs/thesis_proposal/tom-kocmi-proposal.pdf (Year: 2019).*

Disclosed Anonymously, "Culturally Sensitive Cognitive Translations", ip.com, 4 pages, Published Date: Feb. 12, 2020.

Mell et al., "The NIST Definition of Cloud Computing", Recommendations of the National Institute of Standards and Technology, Special Publication 800-145, Sep. 2011, 7 pages.

* cited by examiner

ADAPTIVE LANGUAGE TRANSLATION USING CONTEXT FEATURES

BACKGROUND

The present disclosure relates generally to the field of language translation, and more particularly to leveraging neural networks to enhance translations via contextual features.

Neural networks and machine learning are becoming more and more prevalent in several aspects of computer science. Machine learning models may be used for a wide variety of applications, such as "reading" handwritten documents, generating and calculating algorithms, generating dynamic navigation routes that take into account historical traffic density, etc.

SUMMARY

Embodiments of the present disclosure include a method, computer program product, and system for providing language translations.

A user input in a source language is received. A set of contextual data is received. The user input is encoded into a user input feature vector. The set of contextual data is encoded into a context feature vector. The user input feature vector and the context feature vector are used to generate a fusion vector. An adaptive neural network is trained to identify a second context feature vector, based on the fusion vector. A second user input in the source language is received for translation into a target language. The adaptive neural network is used to determine, based on the second context feature vector, a second user input feature vector. The second user input feature vector is decoded, based on the source language and the target language, into a target language output. A user is notified of the target language output.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of language translation, and more particularly to leveraging neural networks to enhance translations via contextual features. While the present disclosure is not necessarily limited to such applications, various aspects of the disclosure may be appreciated through a discussion of various examples using this context.

Real-time and/or near-time translation tools play an increasingly pivotal role in the global economy by facilitating communication and the sharing of ideas. In these on-demand situations, the traditional methods used are typically one-to-one translations (e.g., one person communicating to one other person using either personal language skills or a translation application). These traditional methods often fail to account for conversational context, cultural and regional differences (e.g., dialects), proper grammar and word choice, emotional connotations of words, cognate differentiation, linguistic noun gender, formality/familiarity when speaking to venerated figures, etc.

Neural networks are being used with increasing frequency for their advantages in accuracy and data feature extraction. When applied to the field of language translation, neural networks may be particularly adept at the identification and extraction of language and conversational context features. For example, in a video chat situation, neural networks may be employed to determine not only the location/region of the users (and thereby infer dialect particularities), but they may also estimate other contextual features which may be important for proper language translations. For example, the ages of the participants may factor into whether either/both users should be using a more formal or polite mode of speech, or the gender of the users may impact how verbs should be conjugated, or how the declension of nouns/names transform across various linguistic cases.

Some embodiments of the present disclosure may be employed not only to perform a translation from a source language into a target language, but to extract context features that may be used to enhance the translation. For example, a neural network may be employed to estimate whether the users are similar in age, which may indicate a more informal mode of speech may be employed in the translations. In another example, information gleaned from internet protocol addresses and/or global positioning system coordinates may be used to determine which region/city each user is from, thereby indicating which dialects may be used. A set of such contextual data may be extracted and transformed into feature vectors that may be used by a neural network performing the language translation to select the most accurate words, phrases, and grammar rules.

Figure 1:
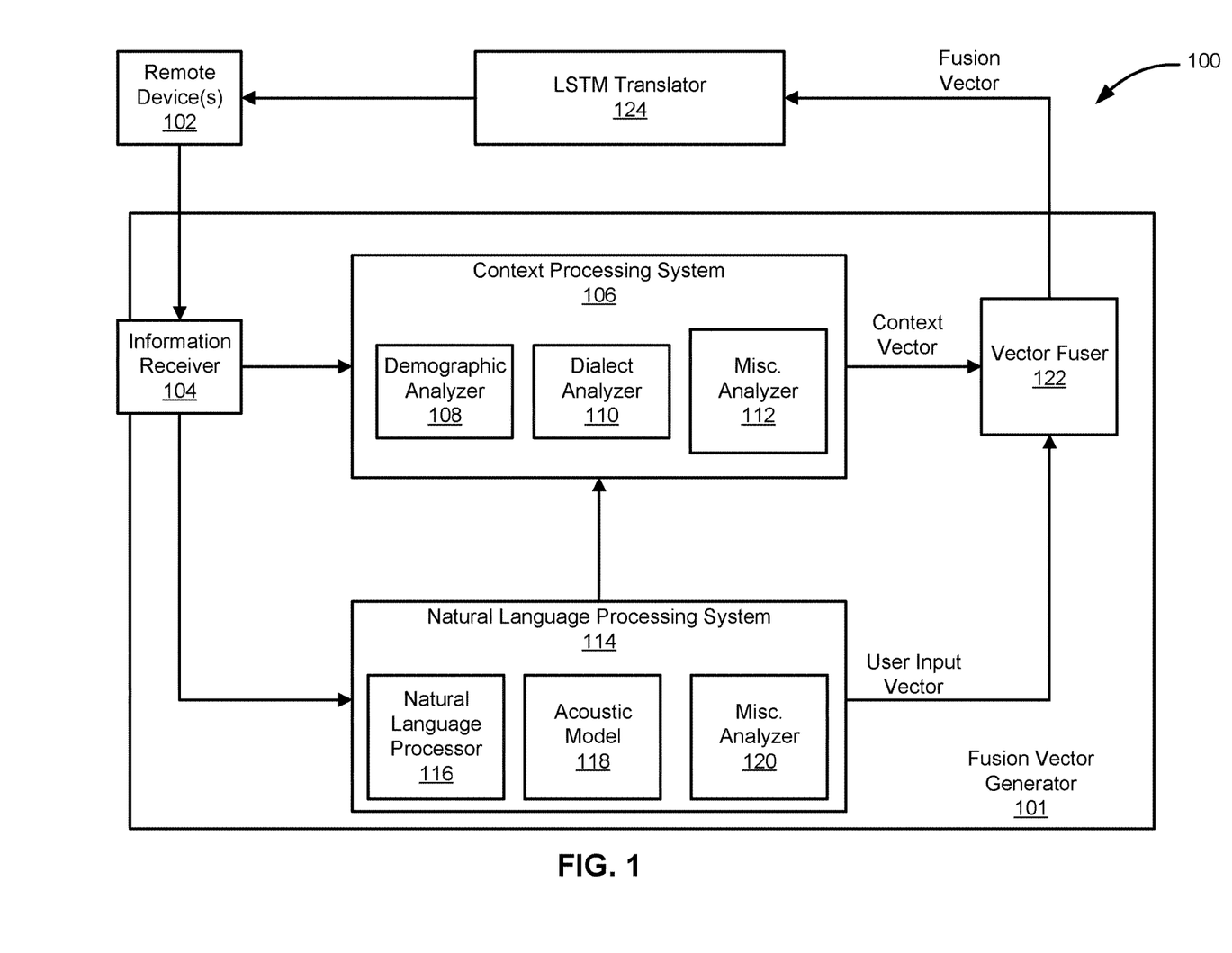
FIG. 1 illustrates a high-level diagram of an example computing environment for providing language translations, in accordance with embodiments of the present disclosure.

Referring now to FIG. 1, illustrated is a high-level diagram of an example computing environment 100 for providing language translations, in accordance with embodiments of the present disclosure. Example computing environment 100 may be implemented as one or more physical devices (e.g., desktop computers, smart phones, tablets, etc.) communicatively coupled to each other (or even potentially a single standalone system), or it may be implemented in some degree using a cloud computing environment where one or more components of the environment are virtualized and run on a set of remote devices operating to sustain the virtualized components via one or more hypervisors. In any of these embodiments, data may be transferred using a physical or wireless network of any suitable configuration and using any suitable communications protocol(s). In some embodiments, encryption may be employed to secure the communications and maintain privacy.

In some embodiments, example computing environment 100 may include one or more remote device(s) 102, a fusion vector generator 101, and a long short-term memory (LSTM) translator 124. In some embodiments, the components of remote device(s) 102, fusion vector generator 101, and LSTM translator 124 may all be included in a single device, or they may embody a different configuration (e.g., LSTM translator 124 may be included in the fusion vector generator 101). The particular configuration of FIG. 1 is meant to be illustrative and not limiting in any way.

In some embodiments, remote device(s) 102 may be, for example, a computing tablet, smart phone, desktop, or the like. Users may interact with remote device(s) 102 to provide inputs for translation, and remote device(s) 102 may provide for the collection of some or all of a set of contextual data for use in enhancing a language translation. For example, an internet protocol address assigned to one or more remote device(s) 102 may be used to extract a region feature for a user. As another example, a video camera and microphone coupled to a remote device 102 may be used to capture images and audio for emotional tone recognition to provide contextual data from which certain context features may be extracted/estimated (e.g., age, gender, emotional state, dialect, etc.). User inputs may include, for example, audio data (e.g., spoken words), textual data (e.g., typed words), or video or image data (e.g., sign language).

Remote device(s) 102 may pass the user inputs to information receiver 104. Information receiver 104 may determine what type of input has been received (e.g., audio, video, image, text, etc.) and route the input(s) to the context processing system 106 and/or natural language processing system 114, as appropriate. In some embodiments, information receiver 104 may parse a single input into several inputs (e.g., a conversion of video into audio and imagery) which may be separately distributed, as appropriate.

Natural language processing system 114 may include, for example, natural language processor 116, acoustic model 118, and misc. analyzer 120. In some embodiments, an audio stream may be the received input. In such instances, acoustic model 118 may be used to convert the audio stream into readable text. In this way, an audio input may be prepared to be processed by natural language processor 116. In some embodiments, acoustic model 118 may be implemented using a neural network, as described herein.

In some embodiments, natural language processor 116 may receive readable text and perform natural language processing techniques to generate structured, machine-readable text.

Misc. analyzer 120 may include a user input vector generator. In such embodiments, misc. analyzer 120 may convert the machine-readable text generated by the natural language processor 116 into an array or matrix of values representing the content of the text. For example, extracted features of the machine-readable text may be encoded into digital vectors representing those features. In some embodiments, Word2Vector techniques (e.g., a set of related, shallow neural networks) may be used to generate the user input vector.

In some embodiments, misc. analyzer 120 may include any number of models and/or processors to enhance the natural language processing system 114. For example, misc. analyzer 120 may include a dialect analyzer similar to dialect analyzer 110, which may provide a more accurate machine-readable text product by incorporating dialect-based insights into the grammar and vocabulary rules used by natural language processor 116.

In some embodiments, the natural language processing system 114 may transmit certain features to the context processing system 106 in order to aid the context processing system 106 in identifying and characterizing context features. Natural language processing system 114 may output the user input vector to vector fuser 122. The user input vector may, in embodiments, be a matrix representing the grammatical and linguistic characteristics of a user input.

In some embodiments, user inputs, or aspects thereof, may be distributed to the context processing system 106 by the information receiver 104. Context processing system 106 may include, for example, a demographic analyzer 108, a dialect analyzer 110, and a misc. analyzer 112. Demographic analyzer 108 may be configured to identify or determine demographic information related to the user(s) submitting the inputs. For example, in some embodiments, demographic analyzer 108 may include a neural network and/or utilize other techniques for determining/estimating the age of the user(s).

Dialect analyzer 110 may include, for example, a neural network or other model for analyzing text and or audio inputs to identify peculiar spellings, grammatical irregularities, spoken accents, etc. which may provide contextual data for identifying or determining a dialect that one or more users is exhibiting. In some embodiments, dialect analyzer 110 may further consider GPS or IP address information in determining a user's dialect.

Misc. analyzer 112 may include any number of additional models and/or feature extractors to identify, determine, and quantify context features. For example, misc. analyzer 112 may include a cognate differentiator to identify and determine true and false cognates. A true cognate is a word that is present in two languages (e.g., spelled or pronounced similarly), and which has the same, or similar, meaning. For example, the word "datum" is the same in both German and Czech and has the same meaning in both languages.

A false cognate is a word that is present in two languages (e.g., spelled or pronounced similarly), but has different meanings in each language. For example, the word "rad" means "bicycle" in German, but in Czech, "rad" means "fondness."

In some embodiments, misc. analyzer 112 may include, for example, models and/or algorithms for identifying and/or determining grammatical differences (e.g., regional dialects differentiation based on grammar rules, such as irregular declensions/conjugations/spellings) within a single language, word choice outliers (e.g., a British "bonnet" vs. an American "hood" for car parts), emotional connotations of words (e.g., using WATSON PERSONALITY INSIGHTS or other emotional tone identification models, or using voiceprint analysis to determine emotional state of a user), linguistic noun gender identification (e.g., the word "bridge" is feminine in Spanish, masculine inanimate in Czech, and neutral in English), formality/familiarity (e.g., differentiation in the level of "politeness" used between the users), etc.

In some embodiments, the context processing system 106 outputs a context vector to the vector fuser 122. The context vector may be embodied in a matrix whose values represent the contextual data extracted or determined from a user input. In some embodiments, the context vector may be generated using "one-of-K" or "one-hot" techniques.

Vector fuser 122 may receive both the user input vector and the context vector and fuse them together in a fusion vector. In some embodiments, vector fuser 122 may include a neural network configured to meld two different vectors, as described in further detail with regard to FIG. 3. In some embodiments, vector fuser 122 may be trained to give greater or lesser weight to particular features represented by either vector. Vector fuser 122 may pass the generated fusion vector to LSTM (long short-term memory) translator 124.

In some embodiments, LSTM may be used as a recurrent neural network architecture and can process single data points (e.g., an image) as well as strings of data (e.g., video data, audio data, slide shows, sequences of algorithms, etc.). LSTM cells/nodes are capable of retaining/"remembering" values, and can be chained together and employed in the encoding and/or decoding processes, as described herein.

In some embodiments, LSTM translator 124 may include a multi-feature language translation model. LSTM translator may receive the fusion vector and train itself to identify the context vector from the fusion vector. Once trained, the LSTM translator 124 may leverage the context vector when providing language translation services to the user(s) to provide translations enhanced by the context features identified by the context processing system 106. In this way, aspects of communication that are overlooked or ignored by traditional translation methods (e.g., the relative ages of the users, regional dialect, formality of speech, cognate differentiation, linguistic genders, irregular declensions, word connotation, emotional tone, etc.) may be leveraged for a more accurate and authentic conversation between the users.

Figure 2A:
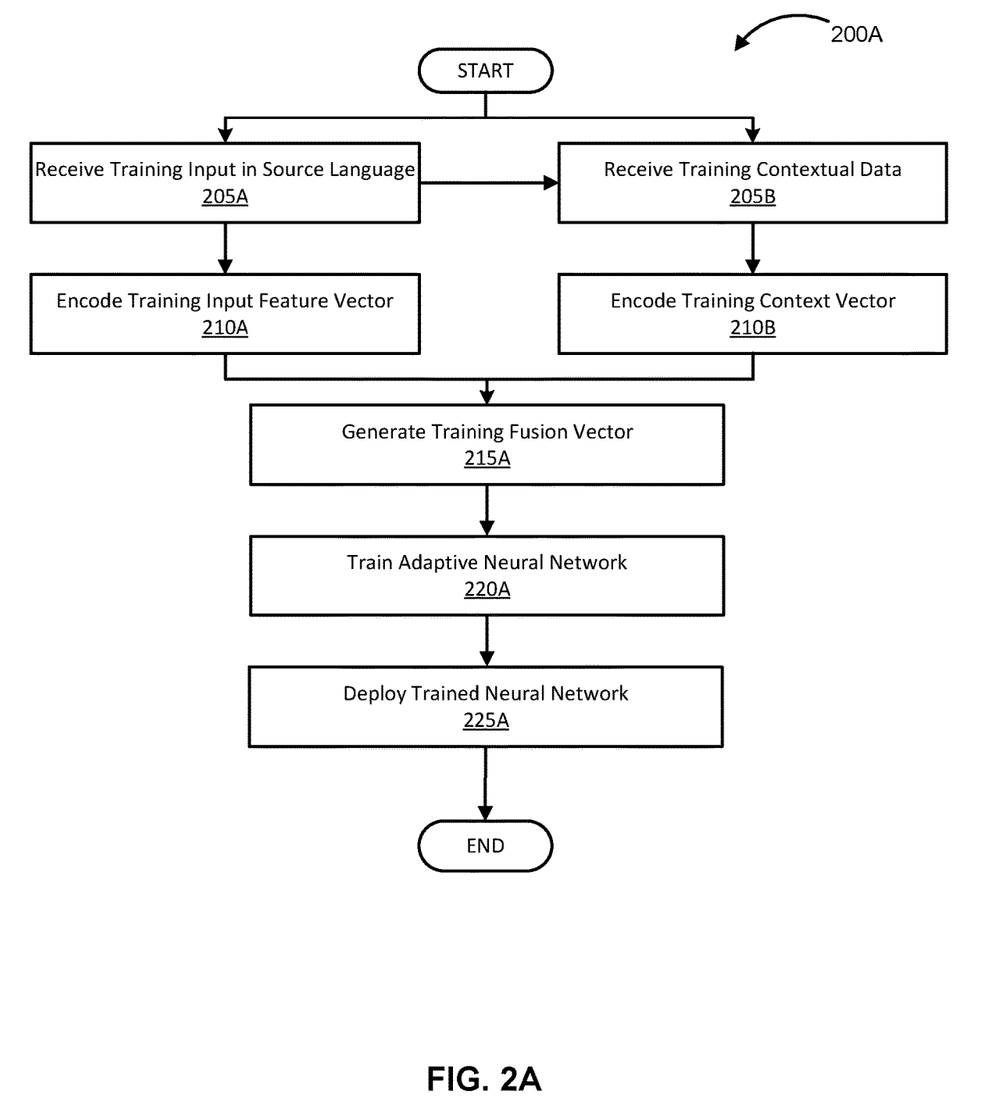
FIG. 2A illustrates a flowchart of a method for training an adaptive neural network to provide language translations, in accordance with embodiments of the present disclosure.

Referring now to FIG. 2A, described is a flowchart for a method 200A for training an adaptive neural network to provide language translations, in accordance with embodiments of the present disclosure. In some embodiments, method 200A may begin at 205A, where a training input (e.g., typed text, video clip, audio clip, etc.) is received in a source language. In some embodiments, method 200A may begin concurrently at 205A and 205B, where training contextual data is also received. For example, some training contextual data may be gathered separately from the words/phrase to be translated, and therefore may be processed separately from the training input received at 205A. However, in some embodiments, the training contextual data received at 205B may be received with the training input at 205A, and parsed out or otherwise sent to 205B, as described herein. In yet other embodiments, training contextual data may be received, in part, with the training input at 205A, as well as received separately, in part, at 205B. In some embodiments, an information receiver 104 may aid in the routing of data.

At 210A, a training input feature vector is encoded. The training input feature vector may be, for example, an array of values or a matrix representing the features extracted by the natural language processing system 114.

At 210B, the training contextual data received at 205B is encoded into a training context vector. As described herein, the training context vector may be an array of values or a matrix representing the context features extracted by the context processing system 106.

At 215A, the training fusion vector is generated, as described herein. The training fusion vector may, for example, be an array of values or a matrix representing the combined data of the training input feature vector and the training context vector. Additional information regarding the training fusion of vectors is given with regard to FIG. 3.

At 220A, an adaptive neural network (for language translation) is trained using the training fusion vector. In some embodiments, the adaptive neural network may be an LSTM neural network, such as LSTM translator 124. In some embodiments, training the adaptive neural network may include a manual adjustment of one or more edges or biases of the adaptive neural network.

At 225A, the trained adaptive neural network may be deployed into a production or runtime environment and made available for use.

Figure 2B:
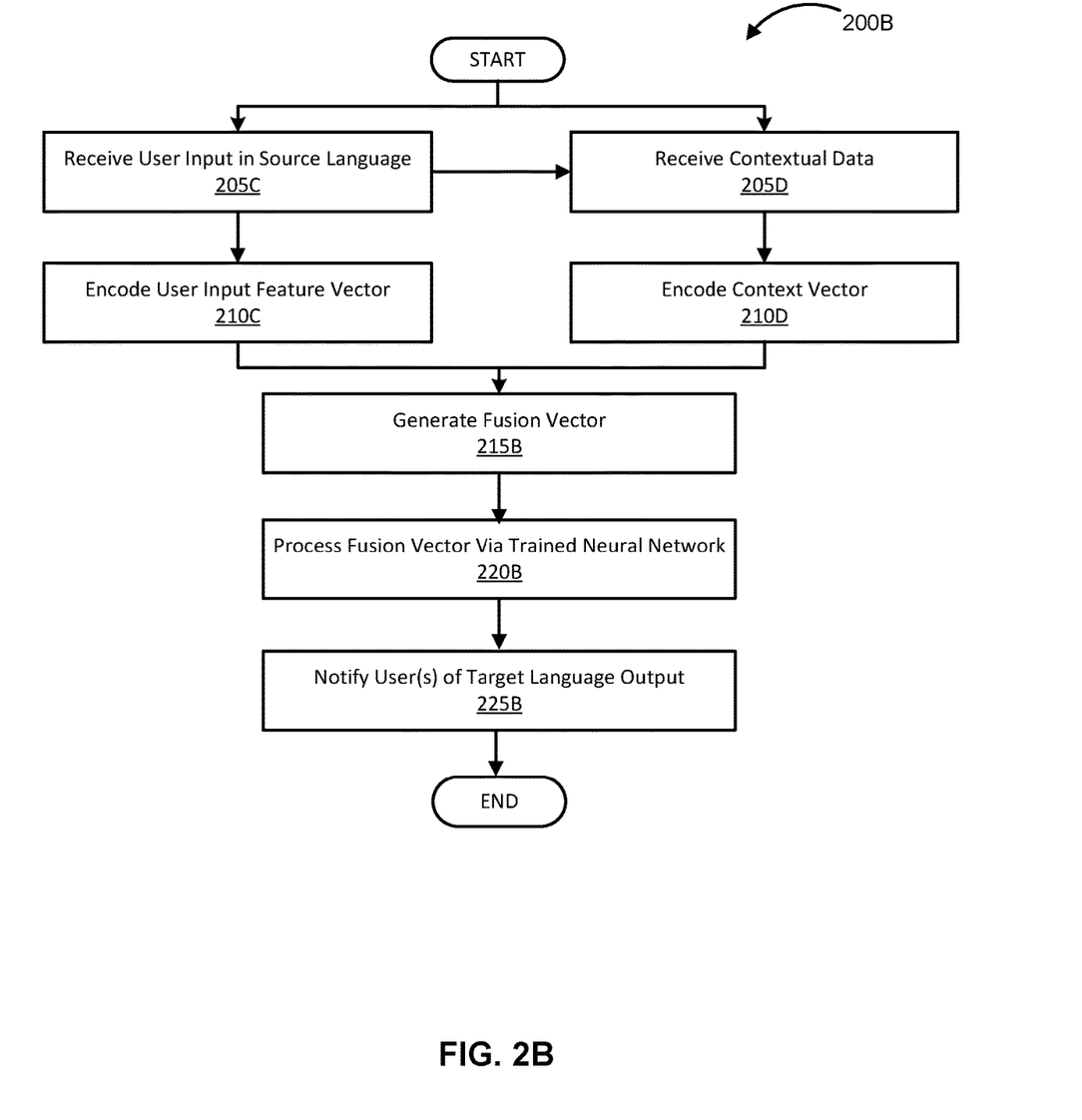
FIG. 2B illustrates a flowchart of a method for providing language translations, in accordance with embodiments of the present disclosure

Referring now to FIG. 2B, illustrated is a flowchart of a method 200B for providing language translations, according to embodiments of the present disclosure. In some embodiments, method 200B may begin at 205C, where a user input (e.g., typed text, video clip, audio clip, etc.) is received in a source language, for translation into a target language. In some embodiments, method 200B may begin concurrently at 205C and 205D, where contextual data is also received. For example, some contextual data may be gathered separately from the words/phrase to be translated, and therefore may be processed separately from the user input received at 205C. However, in some embodiments, the contextual data received at 205D may be received with the user input at 205C, and parsed out or otherwise sent to 205D, as described herein. In yet other embodiments, contextual data may be received, in part, with the user input at 205C, as well as received separately, in part, at 205D. In some embodiments, an information receiver 104 may aid in the routing of data.

At 210C, a user input feature vector is encoded. The user input feature vector may be, for example, an array of values or a matrix representing the features extracted by the natural language processing system 114.

At 210D, the contextual data received at 205D is encoded into a context vector. As described herein, the context vector may be an array of values or a matrix representing the context features extracted by the context processing system 106.

At 215B, the fusion vector is generated, as described herein. The fusion vector may, for example, be an array of values or a matrix representing the combined data of the user input feature vector and the context vector. Additional information regarding the fusion of vectors is given with regard to FIG. 3.

At 220B, the fusion vector is processed by the trained adaptive neural network. In some embodiments, the trained LSTM translator 124 may decode the fusion vector to generate a target language output. In other words, the translation product of the user input is output.

At 225B, the user(s) are notified of the target language output. For example, this may include subtitles of the finished translation appearing on a video feed, a translated text appearing on a smart phone, a translated audio clip playing through a speaker connecter to a user's desktop, etc. In some embodiments, the target language output may appear to only one user, to both users, or to a group of users.

Figure 3:
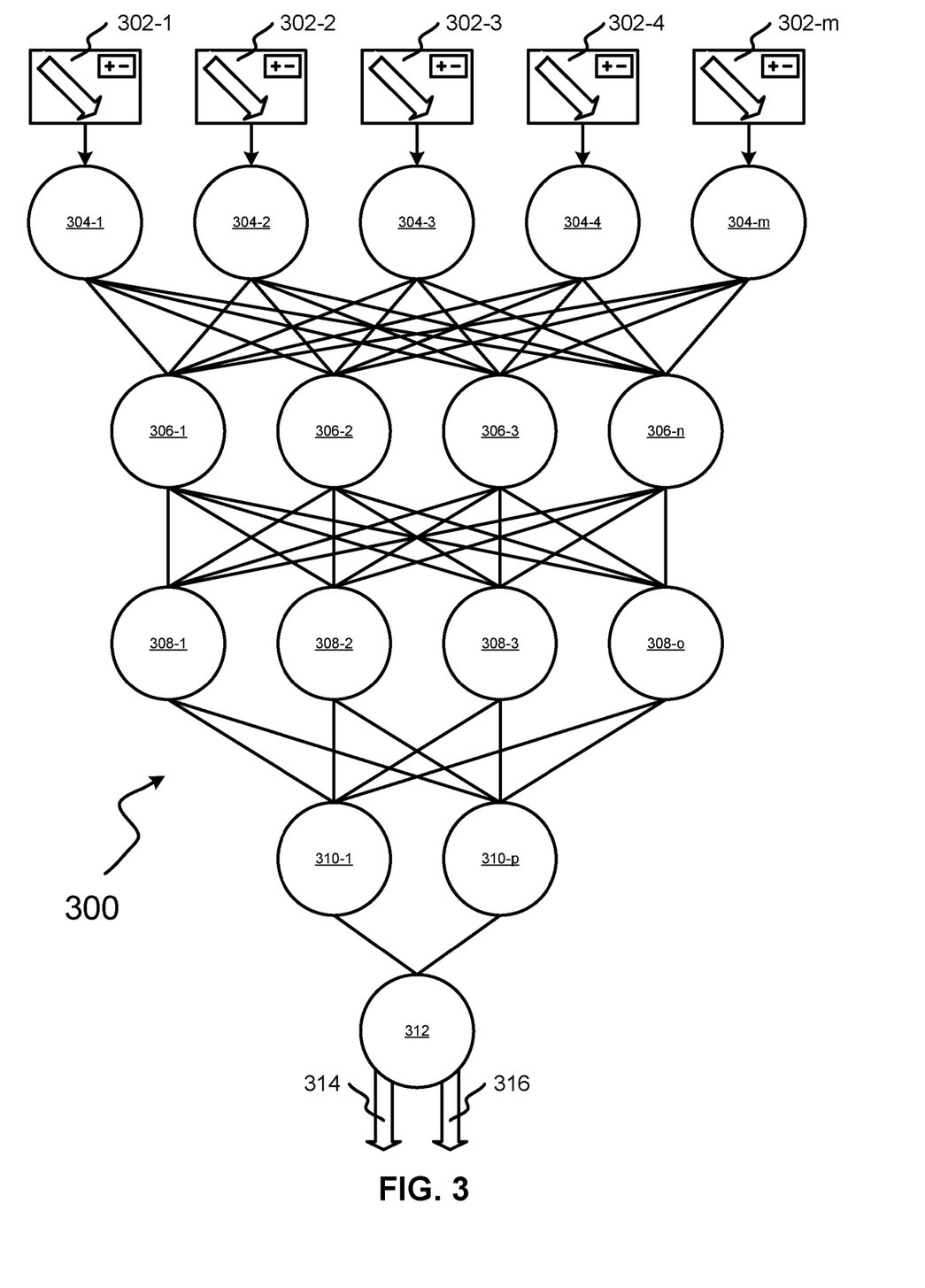
FIG. 3 illustrates an example neural network that may be used to generate vector inputs, feature vectors, and to provide language translations, in accordance with embodiments of the present disclosure.

FIG. 3 depicts an example neural network 300 that may be used to generate a user input feature vector, a context vector, a fusion vector, or to translate one user input from a source language to a target language, in accordance with embodiments of the present disclosure. The example neural network 300 may further be communicably linked to one or more user devices and/or one or more other neural networks. In embodiments, parallel techniques (e.g., Single Instruction Multiple Data (SIMD) techniques) may be employed to concurrently generate vectors, to fuse multiple sets of vectors into a set of fusion vectors, or to translate words/phrases/sentences, etc.

In embodiments, neural network 300 may be a classifier-type neural network. Neural network 300 may be part of a larger neural network (e.g., may be a sub-unit of a larger neural network). For example, neural network 300 may be nested within a single, larger neural network, connected to several other neural networks, or connected to several other neural networks as part of an overall aggregate neural network.

Inputs 302-1 through 302-*m* represent the inputs to neural network 300. In this embodiment, 302-1 through 302-*m* do not represent different inputs. Rather, 302-1 through 302-*m* represent the same input that is sent to each first-layer neuron (neurons 304-1 through 304-*m*) in neural network 300. In some embodiments, the number of inputs 302-1 through 302-*m* (i.e., the number represented by m) may equal (and thus be determined by) the number of first-layer neurons in the network. In other embodiments, neural network 300 may incorporate 1 or more bias neurons in the first layer, in which case the number of inputs 302-1 through 302-*m* may equal the number of first-layer neurons in the network minus the number of first-layer bias neurons. In some embodiments, a single input (e.g., input 302-1) may be input into the neural network. In such an embodiment, the first layer of the neural network may comprise a single neuron, which may propagate the input to the second layer of neurons.

Inputs 302-1 through 302-*m* may comprise one or more samples of classifiable data. For example, inputs 302-1 through 302-*m* may comprise 10 samples of classifiable data. In other embodiments, not all samples of classifiable data may be input into neural network 300.

Neural network 300 may comprise 5 layers of neurons (referred to as layers 304, 306, 308, 310, and 312, respectively corresponding to illustrated nodes 304-1 to 304-*m*, nodes 306-1 to 306-*n*, nodes 308-1 to 308-*o*, nodes 310-1 to 310-*p*, and node 312). In some embodiments, neural network 300 may have more than 5 layers or fewer than 5 layers. These 5 layers may each be comprised of the same number of neurons as any other layer, more neurons than any other layer, fewer neurons than any other layer, or more neurons than some layers and fewer neurons than other layers. In this embodiment, layer 312 is treated as the output layer. Layer 312 outputs a probability that a target event will occur and contains only one neuron (neuron 312). In other embodiments, layer 312 may contain more than 1 neuron. In this illustration no bias neurons are shown in neural network 300. However, in some embodiments each layer in neural network 300 may contain one or more bias neurons.

Layers 304-312 may each comprise an activation function. The activation function utilized may be, for example, a rectified linear unit (ReLU) function, a SoftPlus function, a Soft step function, or others. Each layer may use the same activation function, but may also transform the input or output of the layer independently of or dependent upon the activation function. For example, layer 304 may be a "dropout" layer, which may process the input of the previous layer (here, the inputs) with some neurons removed from processing. This may help to average the data, and can prevent overspecialization of a neural network to one set of data or several sets of similar data. Dropout layers may also help to prepare the data for "dense" layers. Layer 306, for example, may be a dense layer. In this example, the dense layer may process and reduce the dimensions of the feature vector (e.g., the vector portion of inputs 302-1 through 302-*m*) to eliminate data that is not contributing to the prediction. As a further example, layer 308 may be a "batch normalization" layer. Batch normalization may be used to normalize the outputs of the batch-normalization layer to accelerate learning in the neural network. Layer 310 may be any of a dropout, hidden, or batch-normalization layer. Note that these layers are examples. In other embodiments, any of layers 304 through 310 may be any of dropout, hidden, or batch-normalization layers. This is also true in embodiments with more layers than are illustrated here, or fewer layers.

Layer 312 is the output layer. In this embodiment, neuron 312 produces outputs 314 and 316. Outputs 314 and 316 represent complementary probabilities that a target event will or will not occur. For example, output 314 may represent the probability that a target event will occur, and output 316 may represent the probability that a target event will not occur. In some embodiments, outputs 314 and 316 may each be between 0.0 and 1.0, and may add up to 1.0. In such embodiments, a probability of 1.0 may represent a projected absolute certainty (e.g., if output 314 were 1.0, the projected chance that the target event would occur would be 100%, whereas if output 316 were 1.0, the projected chance that the target event would not occur would be 100%).

In embodiments, FIG. 3 illustrates an example probability-generator neural network with one pattern-recognizer pathway (e.g., a pathway of neurons that processes one set of inputs and analyzes those inputs based on recognized patterns, and produces one set of outputs). However, some embodiments may incorporate a probability-generator neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well (e.g., several smaller vectors may merge to create one vector, such as a fusion vector). This merger may increase the ability to identify correlations in the patterns identified among different inputs, as well as eliminate data that does not appear to be relevant.

In embodiments, neural network 300 may be trained/adjusted (e.g., biases and weights among nodes may be calibrated) by inputting feedback and/or input from a user (e.g., via the decision tree/DAG) to correct/force the neural network to arrive at an expected output. In some embodiments, the feedback may be forced selectively to particular nodes and/or sub-units of the neural network, via the decision tree/DAG. In some embodiments, the impact of the feedback on the weights and biases may lessen over time, in order to correct for inconsistencies among user(s) and/or datasets. In embodiments, the degradation of the impact may be implemented using a half-life (e.g., the impact degrades by 50% for every time interval of X that has passed) or similar model (e.g., a quarter-life, three-quarter-life, etc.).

It is to be understood that although this disclosure includes a detailed description on cloud computing, implementation of the teachings recited herein are not limited to a cloud computing environment. Rather, some embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
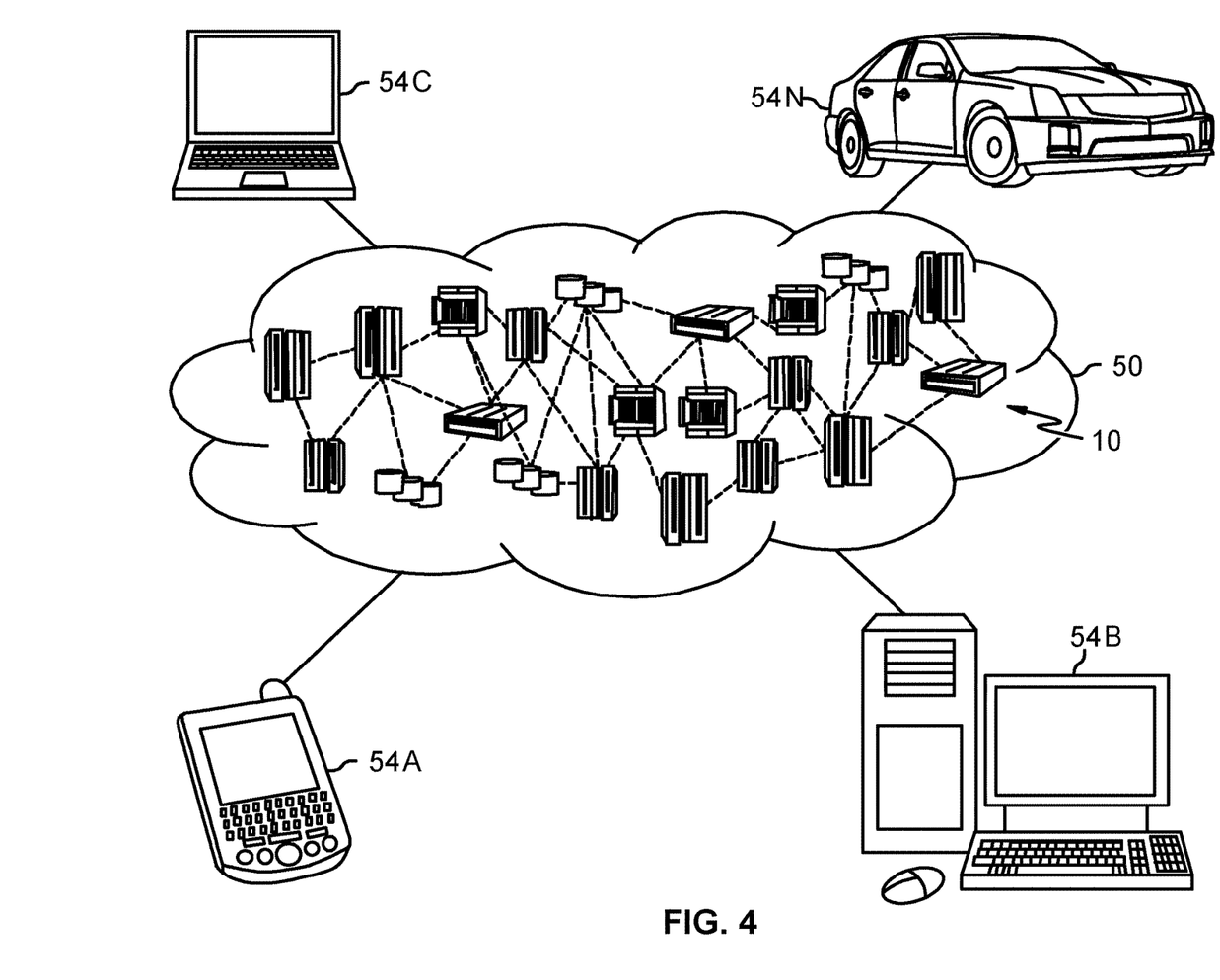
FIG. 4 depicts a cloud computing environment according to an embodiment of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
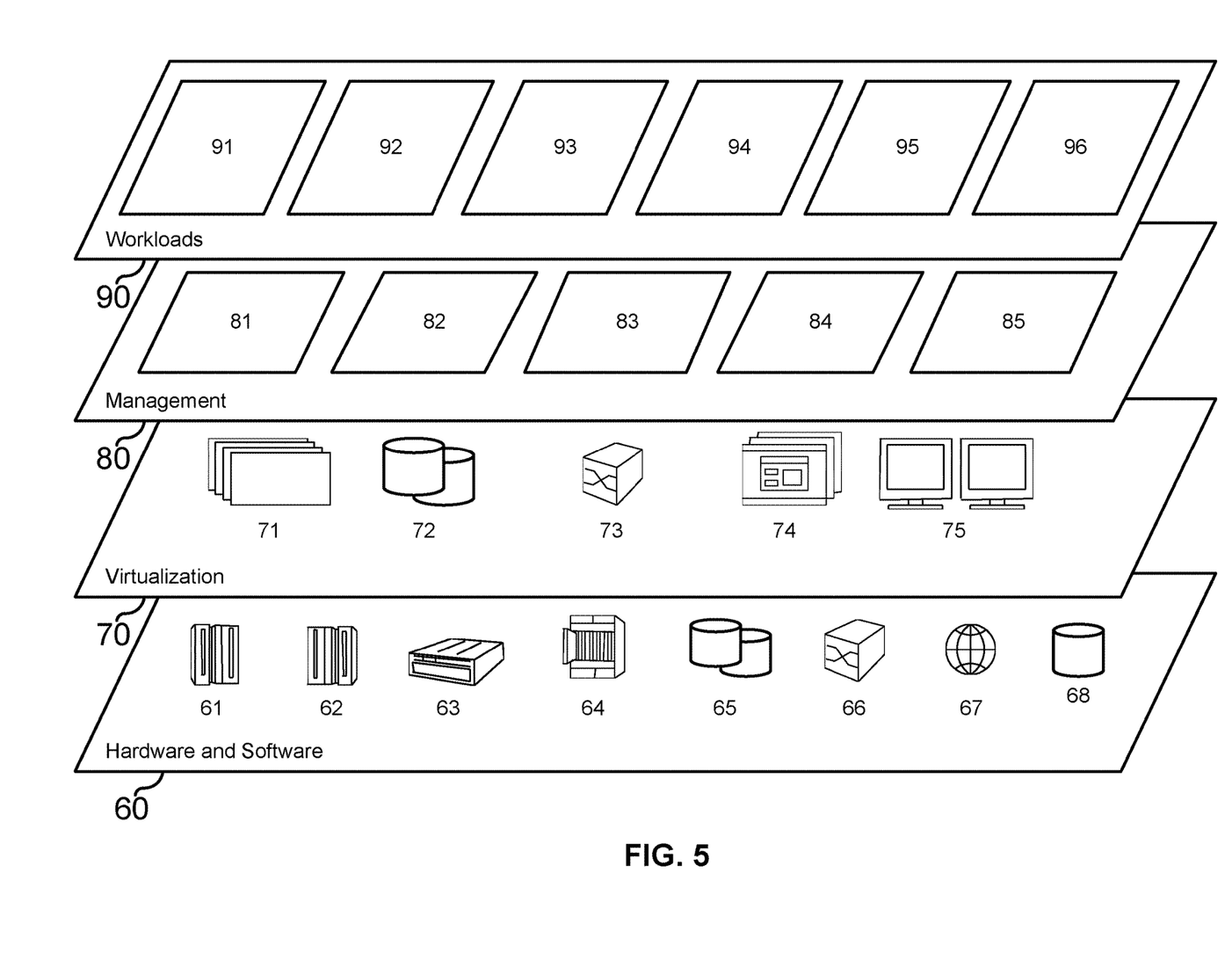
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and some embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and language translation 96.

Figure 6:
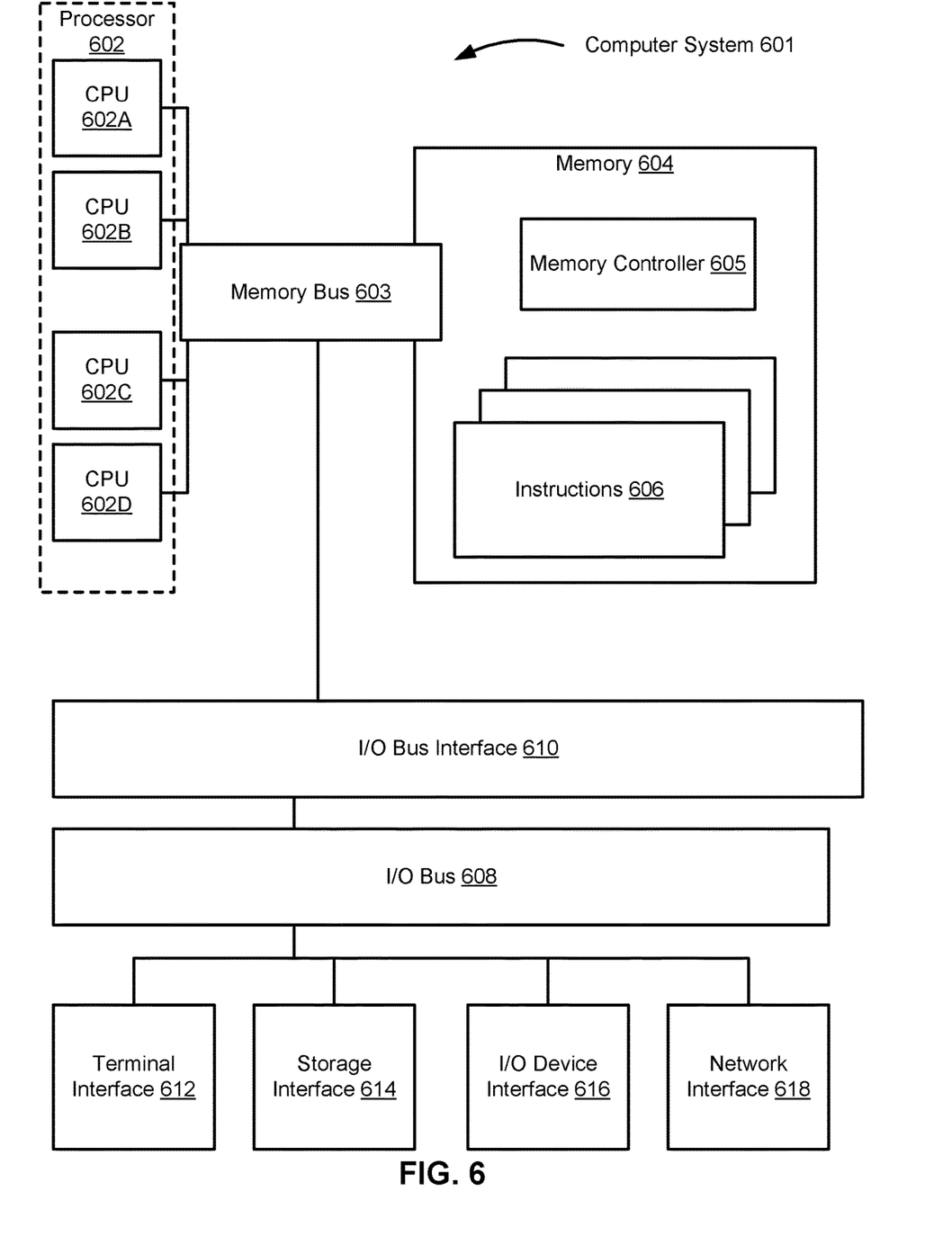
FIG. 6 depicts a high-level block diagram of an example computer system that may be used in implementing embodiments of the present disclosure.

Referring now to FIG. 6, shown is a high-level block diagram of an example computer system 601 that may be configured to perform various aspects of the present disclosure, including, for example, method 200, described in FIG. 2. The example computer system 601 may be used in implementing one or more of the methods or modules, and any related functions or operations, described herein (e.g., using one or more processor circuits or computer processors of the computer), in accordance with embodiments of the present disclosure. In some embodiments, the illustrative components of the computer system 601 comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache. Memory subsystem 604 may include instructions 606 which, when executed by processor 602, cause processor 602 to perform some or all of the functionality described above with respect to FIGS. 1-3B.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601, and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 604 may contain elements for control and flow of memory used by the CPU 602. This may include a memory controller 605.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative example components of an exemplary computer system 601. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing language translations, the method comprising:
   encoding, from a user input in a source language, a user input feature vector comprising a set of user input features, wherein the user input is associated with a first user;
   determining a set of contextual data for the user input, wherein determining the set of contextual data for the user input comprises determining a dialect based on a spoken accent of the user input;

encoding, from the set of contextual data for the user input, a context feature vector;

generating a fusion vector from the user input feature vector and the context feature vector, by using a neural network;

generating, in real-time, a target language output based on the fusion vector and a target language by using a long short-term memory as a recurrent neural network, wherein the LSTM is trained to identify the context feature vector from the fusion vector, and wherein the target language output is generated based on the context feature vector; and notifying a second user of the target language output.

2. The method of claim 1, further comprising notifying the first user of the target language output.

3. The method of claim 1, wherein the set of contextual data includes a set of users, a set of demographic data for each user within the set of users, a dialect of the target language, and a dialect of the source language.

4. The method of claim 3, wherein the set of demographic data for each user includes an age, a linguistic gender, an education level, a set of cultural information, a familiarity level, and a familial relationship.

5. The method of claim 4, wherein the set of demographic data for each user includes a language formality level.

6. The method of claim 1, wherein using the adaptive neural network to generate the target language output includes performing Long Short Term Memory techniques on the fusion vector.

7. The method of claim 6, and wherein training the adaptive neural network to identify the context feature vector includes adjusting a weight or a bias of the adaptive neural network.

8. The method of claim 1, wherein software is provided as a service in a cloud environment to perform the method.

9. A computer program product for providing language translations, the computer program product comprising a computer readable storage medium having program instructions embodied therewith, the program instructions executable by a device to cause the device to:

encode, from a user input in a source language, a user input feature vector comprising a set of user input features, wherein the user input is associated with a first user;

determine a set of contextual data for the user input, wherein determining the set of contextual data for the user input comprises determining a dialect based on a spoken accent of the user input;

encode, from the set of contextual data for the user input, a context feature vector;

generate a fusion vector from the user input feature vector and the context feature vector, by using a neural network;

generate, in real-time, a target language output based on the fusion vector and a target language by using a long short-term memory as a recurrent neural network, wherein the LSTM is trained to identify the context feature vector from the fusion vector, and wherein the target language output is generated based on the context feature vector; and notify a second user of the target language output.

10. The computer program product of claim 9, wherein the program instructions further cause the device to notify the first user of the target language output.

11. The computer program product of claim 9, wherein the set of contextual data includes a set of users, a set of demographic data for each user within the set of users, a dialect of the target language, and a dialect of the source language.

12. The computer program product of claim 11, wherein the set of demographic data for each user includes an age, a linguistic gender, an education level, a set of cultural information, a familiarity level, and a familial relationship.

13. The computer program product of claim 12, wherein the demographic data for each user includes a language formality level.

14. The computer program product of claim 9, wherein using the adaptive neural network to generate the target language output includes performing Long Short Term Memory techniques on the fusion vector.

15. A system for providing language translations, comprising:

a memory with program instructions included thereon; and a processor in communication with the memory, wherein the program instructions cause the processor to:

encode, from a user input in a source language, a user input feature vector comprising a set of user input features, wherein the user input is associated with a first user;

determine a set of contextual data for the user input, wherein determining the set of contextual data for the user input comprises determining a dialect based on a spoken accent of the user input;

encode, from the set of contextual data for the user input, a context feature vector;

generate a fusion vector from the user input feature vector and the context feature vector by using a neural network;

generate, in real-time, a target language output based on the fusion vector and a target language by using a long short-term memory as a recurrent neural network, wherein the LSTM is trained to identify the context feature vector from the fusion vector, and wherein the target language output is generated based on the context feature vector; and notify a second user of the target language output.

16. The system of claim 15, wherein the program instructions further cause the processor to notify the first user of the target language output.

17. The system of claim 15, wherein the set of contextual data includes a set of users, a set of demographic data for each user within the set of users, a dialect of the target language, and a dialect of the source language.

18. The system of claim 17, wherein the set of demographic data for each user includes an age, a linguistic gender, an education level, a set of cultural information, a familiarity level, and a familial relationship.

19. The system of claim 18, wherein the demographic data for each user includes a language formality level.

20. The system of claim 15, wherein using the adaptive neural network to generate the target language output includes performing Long Short Term Memory techniques on the fusion vector.

* * * * *